United States Patent
Tabuchi et al.

(10) Patent No.: US 9,074,876 B2
(45) Date of Patent: Jul. 7, 2015

(54) LENS POSITION DETECTING CIRCUIT

(71) Applicant: Semiconductor Components Industries, LLC, Phoenix, AZ (US)

(72) Inventors: Yoshihisa Tabuchi, Gifu-ken (JP); Yasunori Nagata, Gifu-ken (JP)

(73) Assignee: SEMICONDUCTOR COMPONENTS INDUSTRIES, LLC, Phoenix, AZ (US)

( * ) Notice: Subject to any disclaimer, the term of this patent is extended or adjusted under 35 U.S.C. 154(b) by 0 days.

(21) Appl. No.: 13/713,951

(22) Filed: Dec. 13, 2012

(65) Prior Publication Data

US 2013/0194587 A1 Aug. 1, 2013

(30) Foreign Application Priority Data

Dec. 13, 2011 (JP) ................ 2011-272017

(51) Int. Cl.
*G01B 11/14* (2006.01)
*G01B 11/00* (2006.01)
*G01J 1/18* (2006.01)
*G02B 27/64* (2006.01)

(52) U.S. Cl.
CPC ........ *G01B 11/14* (2013.01); *G03B 2205/0007* (2013.01); *G02B 27/646* (2013.01); *G01J 1/18* (2013.01); *G01B 11/002* (2013.01)

(58) Field of Classification Search
None
See application file for complete search history.

(56) References Cited

U.S. PATENT DOCUMENTS

| | | | | |
|---|---|---|---|---|
| 3,214,594 A | * | 10/1965 | Thomson | 250/214 R |
| 4,693,597 A | * | 9/1987 | Shiomi et al. | 356/3.04 |
| 5,631,817 A | * | 5/1997 | Minami | 363/98 |
| 5,752,092 A | * | 5/1998 | Ohishi et al. | 396/53 |
| 5,890,020 A | * | 3/1999 | Hirasawa | 396/77 |
| 6,043,934 A | * | 3/2000 | Hirunuma et al. | 359/557 |
| 6,201,234 B1 | * | 3/2001 | Chow et al. | 250/214 LS |
| 6,586,719 B1 | * | 7/2003 | Bartzke et al. | 250/221 |
| 7,612,947 B2 | * | 11/2009 | Helwegen et al. | 359/665 |
| 8,809,762 B2 | * | 8/2014 | Tabuchi et al. | 250/214 R |
| 2008/0278613 A1 | * | 11/2008 | Hunter et al. | 348/308 |
| 2009/0128229 A1 | | 5/2009 | Watanabe et al. | |
| 2009/0153679 A1 | | 6/2009 | Nagata et al. | |
| 2009/0160958 A1 | | 6/2009 | Yamada et al. | |
| 2009/0207236 A1 | * | 8/2009 | Feda | 348/47 |

(Continued)

FOREIGN PATENT DOCUMENTS

JP 03115803 A * 5/1991
JP 04125508 A * 4/1992

(Continued)

OTHER PUBLICATIONS esp@cenet Patent Abstract for Japanese Publication No. 2009-128400, publication date Jun. 11, 2009. (1 page).

(Continued)

*Primary Examiner* — Gordon J Stock, Jr.

(57) ABSTRACT

A position of a lens is detected by detecting, using a phototransistor, light that is emitted from a photodiode and that varies depending on lens position. A control unit divides a moving range of the lens into a plurality of areas, approximates a relationship between lens positions and current of the phototransistor for each of the areas, corrects a current of the phototransistor using the approximated relationship so as to obtain a corrected detection current having a linear relationship with respect to lens positions, and detects the position of the lens using the obtained corrected detection current.

20 Claims, 5 Drawing Sheets

(56) References Cited

U.S. PATENT DOCUMENTS

| | | | |
|---|---|---|---|
| 2010/0096535 A1* | 4/2010 | Karasikov et al. | 250/206 |
| 2011/0193977 A1* | 8/2011 | Yamada et al. | 348/208.2 |
| 2012/0154550 A1* | 6/2012 | Takagi et al. | 348/49 |
| 2012/0154614 A1 | 6/2012 | Moriya et al. | |
| 2012/0327293 A1* | 12/2012 | Ollila et al. | 348/362 |
| 2013/0187029 A1* | 7/2013 | Tabuchi et al. | 250/208.2 |
| 2014/0218752 A1* | 8/2014 | Tabuchi et al. | 356/614 |

FOREIGN PATENT DOCUMENTS

| | | |
|---|---|---|
| JP | 2006-227274 A | 8/2006 |
| JP | 2009128400 A | 6/2009 |
| JP | 2009-145634 A | 7/2009 |
| JP | 2009-151203 A | 7/2009 |
| JP | 2009-156947 A | 7/2009 |
| JP | 2010-032965 A | 2/2010 |
| JP | 2011-065140 A | 3/2011 |

OTHER PUBLICATIONS esp@cenet Patent Abstract for Japanese Publication No. 2009-156947, publication date Jul. 16, 2009. (1 page).
esp@cenet Patent Abstract for Japanese Publication No. 2006-227274, publication date Aug. 31, 2006. (1 page).
esp@cenet Patent Abstract for Japanese Publication No. 2009-145634, publication date Jul. 2, 2009. (1 page).
esp@cenet Patent Abstract for Japanese Publication No. 2009-151203, publication date Jul. 9, 2009. (2 pages).
esp@cenet Patent Abstract for Japanese Publication No. 2010-032965, publication date Feb. 12, 2010. (1 page).
esp@cenet Patent Abstract for Japanese Publication No. 2011-065140, publication date Mar. 31, 2011. (1 page).

* cited by examiner

LENS POSITION DETECTING CIRCUIT

TECHNICAL FIELD

The present invention relates to a lens position detecting circuit that detects a position of a lens by detecting, using a phototransistor, light that is emitted from a photodiode and that varies depending on lens position.

BACKGROUND ART

Conventionally, various cameras are provided with a vibration compensation function. The vibration compensation is achieved by moving the lens in accordance with camera movement to thereby obtain an image in which vibrations are compensated for. In order to execute this vibration compensation, the lens must be driven appropriately, and this requires accurate detection of the lens position.

For detecting positions of various components, there has been provided an arrangement in which a magnet is mounted on the target component and a Hall element for detecting this magnet is used. A Hall element is also being used for detecting a lens position.

CITATION LIST

Patent Literature

[Patent Literature 1] JP 2009-128400 A
[Patent Literature 2] JP 2009-156947 A
[Patent Literature 3] JP 2006-227274 A

SUMMARY OF INVENTION

Technical Problem

However, a Hall element is relatively costly. Moreover, for applications such as cameras in cell phones and smartphones where space reduction is required, or special device shapes are desired by users, it may not be possible to sufficiently satisfy such requirements or desires when a Hall element is used. It is therefore necessary to consider alternative detection methods. For example, one alternative detection method may be an optical detection method, in which a photodetector such as a photo-reflector or a photo-interrupter may be used. A photo-reflector is a device in which light emitted from a photodiode is reflected off a target and the reflected light is detected using a phototransistor. By configuring such that the received light amount at the phototransistor varies depending on lens position, the position of the lens can be detected.

While it is convenient when the relationship between lens positions and output from the phototransistor of the photo-reflector is linear, there are cases in which this relationship is nonlinear. For example, there have been confirmed cases in which the relationship becomes nonlinear along with changes in the positional relationship between the detection target provided for lens detection and the photo-reflector, and it is necessary to carry out appropriate positional detection for such cases.

Solution to Problem

The present invention provides a lens position detecting circuit that detects a position of a lens by detecting, using a phototransistor, light that is emitted from a photodiode and that varies depending on lens position. The lens position detecting circuit comprises: a correcting unit that divides a moving range of the lens into a plurality of areas, approximates a relationship between lens positions and current of the phototransistor for each of the areas, and corrects a current of the phototransistor using the approximated relationship so as to obtain a corrected detection current having a linear relationship with respect to lens positions; and a detecting unit for detecting the position of the lens using the obtained corrected detection current.

Preferably, the correcting unit linearly approximates the relationship between lens positions and current of the phototransistor for each area.

Advantageous Effects of Invention

According to the present invention, since the detection current is corrected and a linear output can thereby be obtained, lens position detection can be performed effectively using a nonlinear output.

DESCRIPTION OF EMBODIMENTS

The embodiments of the present invention are described below with reference to the attached drawings.

Figure 1:
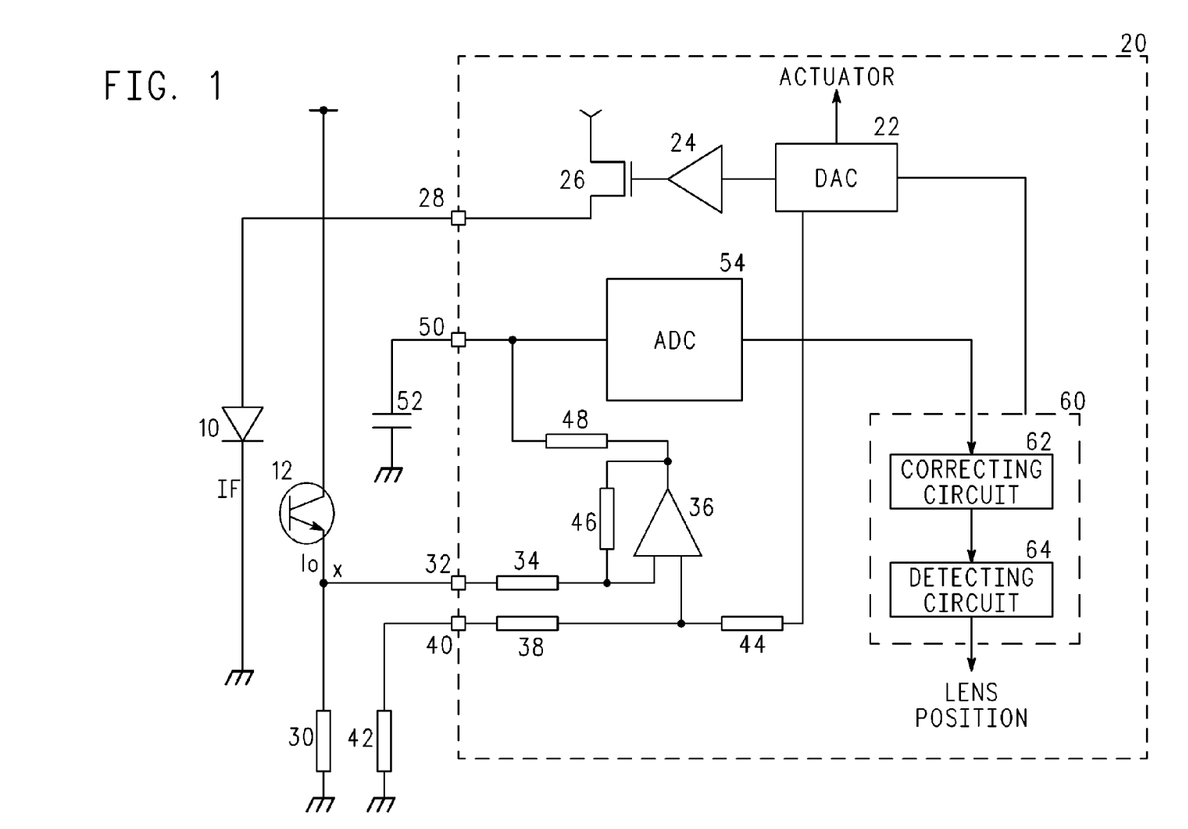
FIG. 1 is a diagram showing a configuration of a lens position detecting circuit according to an embodiment of the present invention.

FIG. 1 is a diagram showing a configuration of a lens position detecting circuit according to an embodiment of the present invention. A photo-reflector serving as a photodetector includes a photodiode 10 and a phototransistor 12, which are provided external to a semiconductor integrated circuit 20. When light emitted from the photodiode 10 is reflected off a detection target and the reflected light is introduced into the phototransistor 12, a current according to the incident light amount flows through the phototransistor 12. Even while the amount of emitted light from the photodiode 10 remains constant, when the detection target is moved in accordance with the lens position, the received light amount at the phototransistor 12 varies. By detecting the amount of current through the phototransistor 12, the lens position is detected. Since the lens position should be detected along two directions of x and y, two photo-reflectors are provided to detect the lens position in both the x and y directions. A reflector plate or the like attached to the lens serves as the detection target.

In the semiconductor integrated circuit 20, based on input data concerning a constant current to be caused to flow through the photodiode 10, a DAC 22 outputs a corresponding constant voltage. The output from the DAC 22 is stabilized by an amplifier 24 and subsequently supplied to the gate of an n-channel output transistor 26. The drain of the output transistor 26 is connected to a power supply, while the source of the output transistor 26 is connected via a terminal 28 to the anode of the externally-provided photodiode 10. The cathode of the photodiode 10 is grounded. Accordingly, a constant current IF in accordance with the data input to the DAC 22 is supplied from the power supply to the photodiode 10 via the output transistor 26. It may be preferable to provide a means for controlling the constant current IF, which may include a structure that detects a current flowing through the output transistor 26 and provides feedback control to the data input to the DAC 22.

The collector of the phototransistor 12 is connected to a power supply, while the emitter of the phototransistor 12 is grounded via a current detecting resistor 30. Accordingly, as described above, a current in accordance with the light amount received at the phototransistor 12 flows through the phototransistor 12 and the current detecting resistor 30. Further, a detection voltage ("point-X voltage") in accordance with the current flowing through the phototransistor 12 is obtained at point X (i.e., point of connection between the phototransistor 12 and the current detecting resistor 30) located above the current detecting resistor 30.

The point-X voltage is introduced into the semiconductor integrated circuit 20 via a terminal 32, and input to the negative input terminal of an operational amplifier 36 via a resistor 34. The positive input terminal of the operational amplifier 36 is connected via a resistor 38, a terminal 40, and an external resistor 42, to ground outside the semiconductor integrated circuit 20. Further, the positive input terminal of the operational amplifier 36 is also connected to one end of a resistor 44. To the other end of this resistor 44, the DAC 22 supplies a reference voltage indicative of the phototransistor 12 current obtained when the lens is located at a reference position. As such, the voltage at the positive input terminal of the operational amplifier 36 is equal to a voltage ("set voltage") obtained by dividing the reference voltage by the resistor 44 and a sum of the resistor 38 and the external resistor 42. The reference voltage is set according to a reference voltage data supplied to the DAC 22. The set voltage at the positive input terminal of the operational amplifier 36 can be adjusted by changing the reference voltage data input to the DAC 22 or by changing the resistance value of the external resistor 42.

The output terminal of the operational amplifier 36 is connected as feedback to its negative input terminal via a resistor 46. Accordingly, the voltage at the output terminal of the operational amplifier 36 is equal to a voltage obtained by amplifying a voltage difference between the positive and negative input terminals in accordance with the resistance values of the resistors 34 and 46.

Further, the output terminal of the operational amplifier 36 is also connected via a resistor 48 and a terminal 50 to a capacitor 52, which has its other end connected to ground outside the semiconductor integrated circuit 20. With this arrangement, a voltage signal obtained by integrating (subjecting to low-pass filtering) the output from the operational amplifier 36 is obtained at the terminal 50. This voltage signal of the terminal 50 is input to the ADC 54. In other words, the ADC 54 receives input of a voltage corresponding to a difference between the detection voltage, which corresponds to the amount of current that flows in the phototransistor 12 in accordance with the received light amount, and the set voltage. Therefore, in an output from the ADC 54, data in accordance with the lens position can be obtained.

The output from the ADC 54 is supplied to a control unit 60, and the lens position is identified in the control unit 60. The control unit 60 performs various controls in accordance with the obtained lens position, such as control of a lens driving actuator. The actuator may be controlled by, for example, driving an H-Bridge driver with a PWM pulse.

According to the configuration of the present embodiment, the current Io of the phototransistor 12 is converted into a voltage and compared with the set voltage, and the comparison result is used to detect the lens position. Although a conversion is made, the detection of the lens position is in fact made on the basis of the current Io.

When the control unit 60 detects the lens position based on a detected voltage supplied from the ADC 54, the control unit 60 corrects the detected voltage so as to obtain a corrected detected voltage having a linear relationship with respect to lens positions, and then performs lens position detection based on the corrected detected voltage.

More specifically, when there is a deviation from a set configuration in terms of the distance between the detection target (which reflects light from the photodiode 10 during lens position detection) and the photo-reflector (the photodiode 10 and the phototransistor 12), or in terms of the position of the detection target within the moving surface, the relationship of the photo-reflector output with respect to lens positions become nonlinear.

Figure 2:
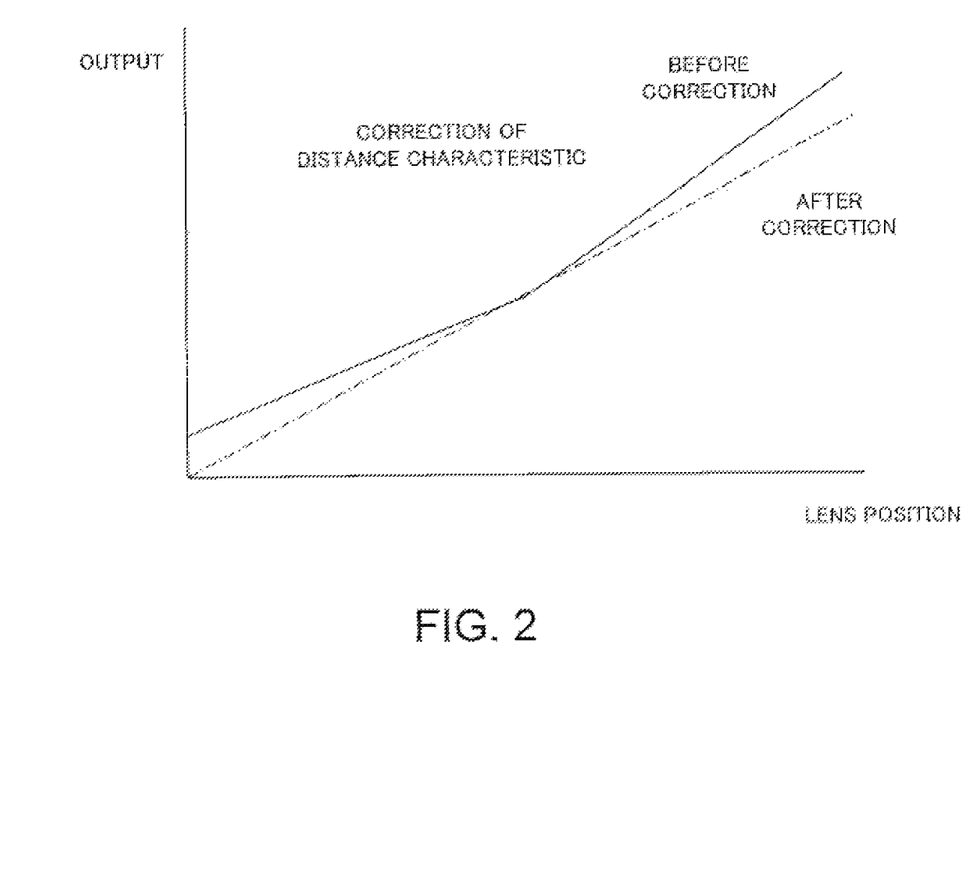
FIG. 2 is a diagram showing a distance characteristic of the output.
Figure 3:
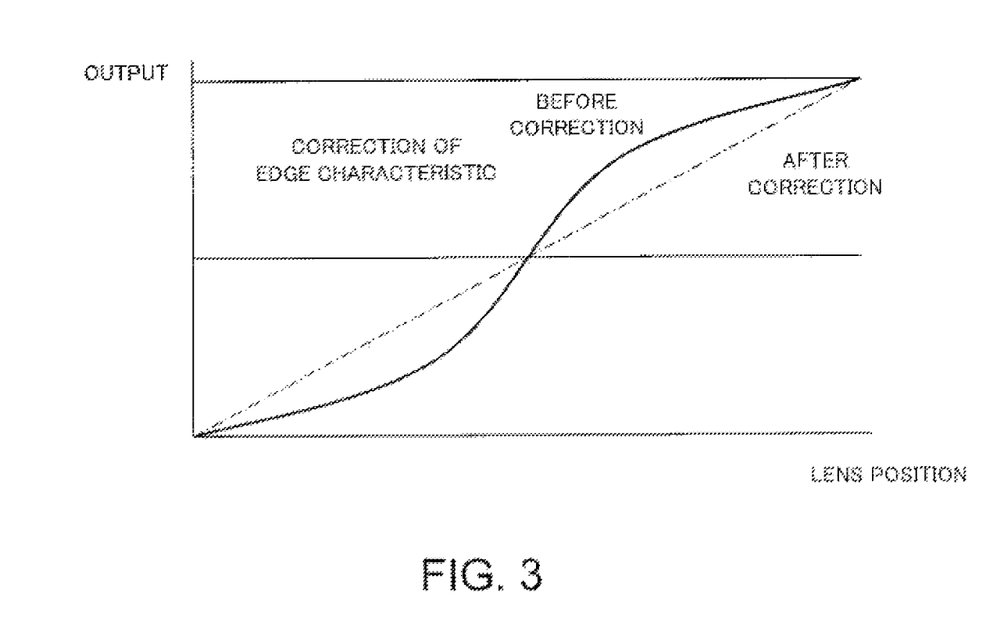
FIG. 3 is a diagram showing an edge characteristic of the output.

For example, when the distance is different from the set distance, the output characteristic changes near the midpoint of the lens positions, as shown in FIG. 2. Further, when the detection target is positionally deviated within the moving surface resulting in influences caused by the edges of the detection target, the output characteristic becomes different respectively for lens positions toward one side, lens positions in the middle part, and lens positions toward the other side, as shown in FIG. 3. It should be noted that such alterations in the output characteristic vary depending on factors such as the shape and the set position of the detection target, and that the output characteristic does not necessarily resemble those shown in FIGS. 2 and 3.

According to the present embodiment, the output of the photo-reflector is corrected so that the obtained corrected output has a linear relationship with respect to lens positions.

In this embodiment, the output is divided into three areas. In each area, it is assumed that the relationship between lens positions and the photo-reflector output (i.e., detection current of the phototransistor 12) is linear, and an actual output is corrected to a corrected output having a linear relationship to lens positions.

Figure 4:
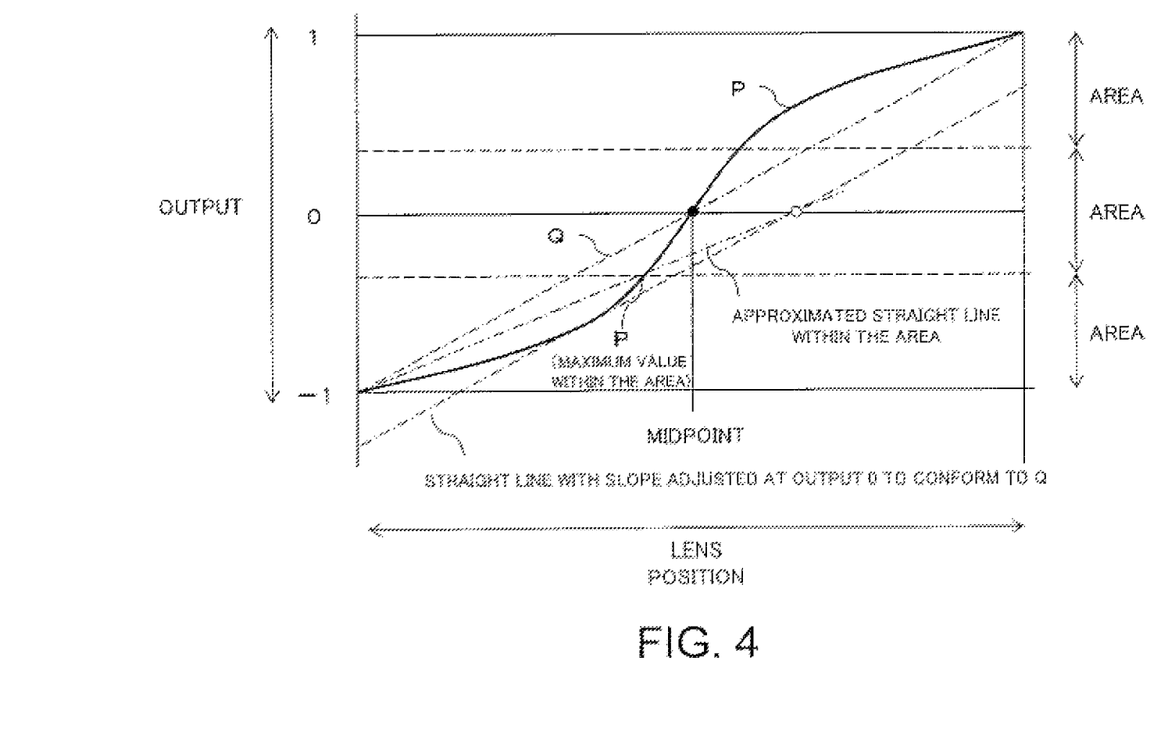
FIG. 4 is a diagram explaining the correction details.

FIG. 4 shows example correction details, for the lowermost area. First, concerning the entire detection range, based on outputs for the range from L0 to Lmax, a straight line indicating a relationship of those outputs with respect to the corresponding lens positions is determined. In this example, the outputs have numerical values ranging from −1 to +1.

When the lens position is denoted by x, the corrected output Q equals ax. Here, the slope a is a slope obtained by dividing the range of change of the outputs by the range of change of the lens position.

In FIG. 4, the curve shown by a bold line is the output P obtained corresponding to the lens positions. An output shown by P corresponding to a lens position is corrected to an output shown by Q for that lens position. A corrected output Q for the same position as an output P is obtained by performing calculations in each area to change the slope and make a shift corresponding to the intercept, which can be performed according to the equation Q=aP+b. In the calculations, the coefficients a and b are differed for the respective areas. By way of example, control unit 60 includes a correcting circuit 62 and stores a slope a and an intercept b for each of the areas, and calculates the corrected detection current Q for each area according to Q=aP+b, where P denotes the current of the phototransistor. A detecting circuit 64 detects the position of the lens using the obtained corrected detection current Q.

In any case, the output P for the lens positions x is known, and what is required here is that the output corresponding to the lens positions x equals Q. Accordingly, it is simply sufficient to determine the relationship between the lens positions and the output P in each area, and to set for each area a relational expression for converting the output P into the corrected output Q.

Here, in order to achieve position detection with high accuracy, the output Q for the midpoint of lens movement is set to the midpoint of the output. An intersection point between an approximated straight line in each area and the midpoint of the output is determined, and calculations are performed to obtain a straight line having a slope adjusted at this intersection point to conform to the slope of Q. The calculated straight line is then shifted according to its intercept so as to match the straight line position of Q. In this way, conversion equations for all of the areas can be obtained in the same manner.

Concerning the areas into which the output is divided, as the number of the areas is increased, the linear approximation within each area becomes more accurate. In an alternative embodiment, the approximation within each area may be an approximation to a polynomial expression.

As described above, according to the present embodiment, when the output from the photo-reflector is nonlinear with respect to the positions of the detection target corresponding to the lens, the photo-reflector output is corrected so that the output has a linear relationship to the lens positions. Accordingly, the corrected output as is can be employed as a signal expressing the lens position.

The lens position is detected along the two directions of x and y. For this purpose, the photodiode 10 and the phototransistor 12 are provided in two sets for the x and y directions, respectively, and the two detected position values are recognized in the control unit 60. In this case, temperature detection may be performed using the forward drop voltage of only one of the photodiodes 10. Further, it is desirable to have the DAC 22 and the ADC 54 carry out processing for both the x and y directions in a time-divided manner.

Figure 5:
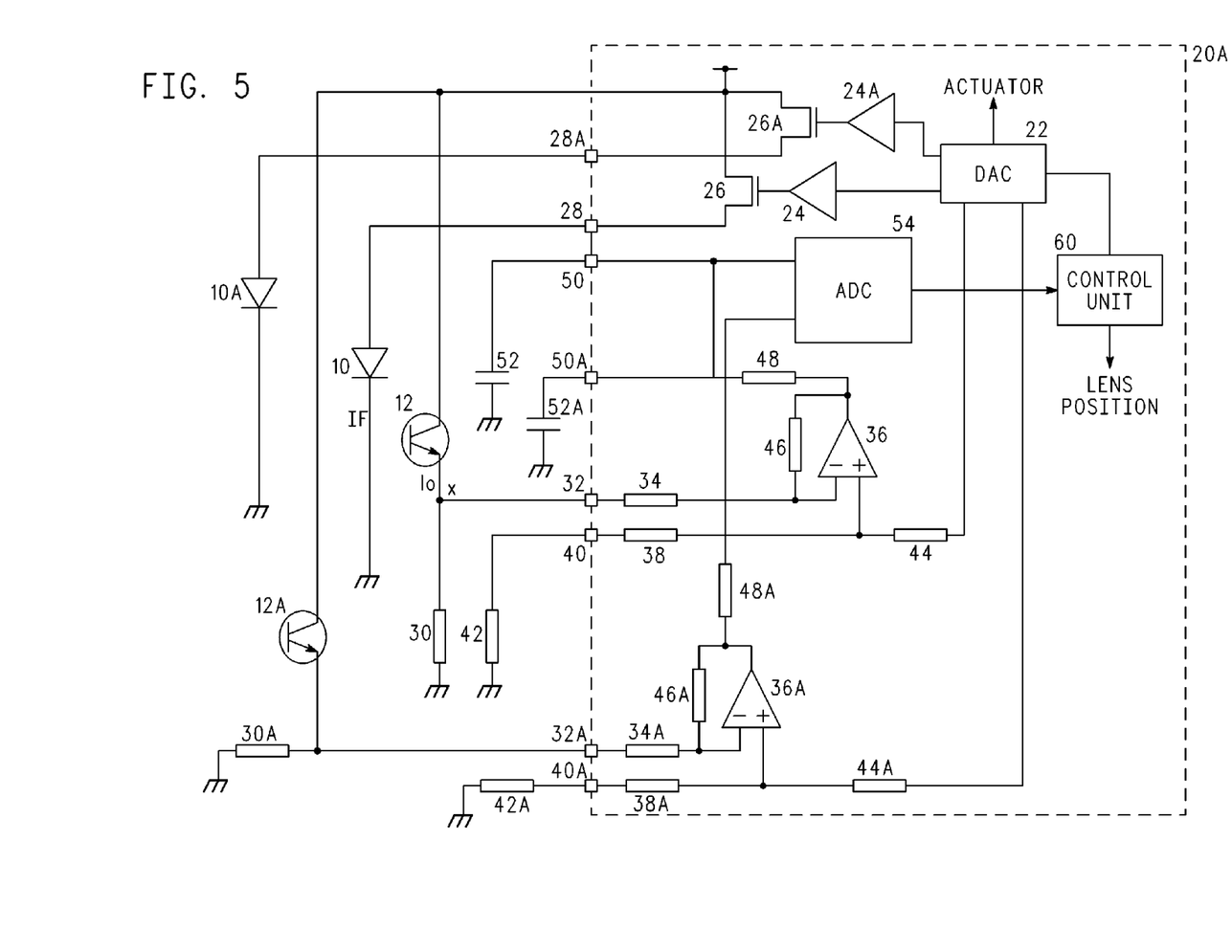
FIG. 5 is a circuit schematic of a lens position detecting circuit in accordance with another embodiment of the present invention.

FIG. 5 is a circuit schematic of a lens position detecting circuit in accordance with another embodiment of the present invention. As discussed with reference to FIG. 1, the lens position detecting circuit includes photodiode 10, phototransistor 12, amplifier 24, transistor 26, DAC 22, ADC 54, control unit 60, operational amplifier 36, resistors 30, 34, 48, 42, 44, 46, and 48, and inputs 28, 32, 40, 50, and a capacitor 52. In addition to these elements, the lens position detecting circuit of FIG. 5 includes a photodiode 10A, a phototransistor 12A, an amplifier 24A, a transistor 26A, DAC 22, ADC 54, control unit 60, an operational amplifier 36A, resistors 30A, 34A, 48A, 42A, 44A, 46A, and 48A, and inputs 28A, 32A, 40A, 50A, and a capacitor 52A, wherein the reference character "A" has been appended to the elements of the lens position detecting circuit of FIG. 5 that are configured similarly to the elements of lens position detecting circuit of FIG. 1. Thus, photodiode 10, phototransistor 12, an amplifier 24, transistor 26, operational amplifier 36, resistors 30, 34, 38, 42, 44, 46, 48, inputs 28, 32, 40, 50, and a capacitor 52 correspond to a first photodetector, whereas photodiode 10A, phototransistor 12A, amplifier 24A, transistor 26A, operational amplifier 36A, resistors 30A, 34A, 38A, 42A, 44A, 46A, ad 48A, inputs 28A, 32A, 40A, 50A, and a capacitor 52A correspond to a second photodetector. DAC 22, ADC 54, and control unit 60 are associated with both the first photodetector and the second photodetector. It should be noted that the integrated circuit of the lens position detecting circuit shown in FIG. 5 is identified by reference character 20A and includes amplifier 24, transistor 26, operational amplifier 36, resistors 34, 38, 44, 46, 48, inputs 28, 32, 40, and 50, photodiode 10A, phototransistor 12A, amplifier 24A, transistor 26A, operational amplifier 36A, resistors 34A, 38A, 44A, 46A, and 48A, inputs 28A, 32A, 40A, 50A, DAC 22, ADC 54, and control unit 60.

REFERENCE SIGNS LIST 10 photodiode; 12 phototransistor; 20 semiconductor integrated circuit; 24 amplifier; 26 output transistor; 28, 32, 40, 50, terminal; 30 current detecting resistor; 34, 38, 42, 44, 46, 48 resistor; 36 operational amplifier; 52 capacitor; 60 control unit.

The invention claimed is:

1. A lens position detecting circuit that detects a position of a lens by detecting, using a phototransistor, light that is emitted from a photodiode and that varies depending on lens position, the lens position detecting circuit comprising:
 a correcting circuit that divides a moving range of the lens into a plurality of areas, approximates a relationship between lens positions and current of the phototransistor for each of the areas, and corrects a current of the phototransistor using the approximated relationship so as to obtain a corrected detection current having a linear relationship with respect to lens positions; and
 a detecting circuit for detecting the position of the lens using the obtained corrected detection current.

2. The lens position detecting circuit according to claim 1, wherein the correcting circuit linearly approximates the relationship between lens positions and current of the phototransistor for each area.

3. The lens position detecting circuit according to claim 2, wherein the correcting circuit stores a slope a and an intercept b for each of the areas, and calculates the corrected detection current Q for each area according to $Q=aP+b$, where P denotes the current of the phototransistor.

4. A lens position detecting circuit that detects a position of a lens by detecting, using a phototransistor, light that is emitted from a photodiode and that varies depending on lens position, the lens position detecting circuit comprising:
 a correcting circuit that approximates a relationship between lens positions and current of the phototransistor and corrects a current of the phototransistor using the approximated relationship so as to obtain a corrected detection current having a linear relationship with respect to lens positions; and
 a detecting circuit for detecting the position of the lens using the obtained corrected detection current.

5. The lens position detecting circuit of claim 4, wherein the correcting circuit linearly approximates the relationship between lens positions and current of the phototransistor.

6. The lens position detecting circuit of claim 5, wherein the correcting circuit stores a slope a and an intercept b, and calculates the corrected detection current Q according to $Q=aP+b$, where P denotes the current of the phototransistor.

7. The lens position detecting circuit of claim 6, wherein the lens position detecting circuit further comprises:
 a digital to analog converter having an input and a plurality of outputs;
 a transistor having a control terminal and first and second current carrying terminals, the control terminal coupled to a first output of the digital to analog converter; the first current carrying terminal coupled for receiving a first source of operating potential, and the second current carrying terminal coupled to a first circuit terminal;
 a first amplifier having an inverting input, a noninverting input, and an output, the noninverting input coupled to a second output of the digital to analog converter, the inverting input coupled to a second circuit terminal, and the output of the first amplifier coupled to a third circuit terminal; and an analog to digital converter having an input and an output, the input of the analog to digital converter coupled to the third circuit terminal.

8. The lens position detecting circuit of claim 7 further including a second amplifier having an input coupled to the first output of the digital to analog converter and an output coupled to the control terminal of the transistor.

9. The lens position detecting circuit of claim 7, wherein the detecting circuit of a control unit having an input and first and second outputs, the input of the control unit coupled to the output of the analog to digital converter and the first output of the control unit coupled to the third input of the digital to analog converter, wherein the control unit is configured to divide a moving range of the lens into a plurality of areas, approximates a relationship between lens positions and current of the phototransistor for each of the areas, corrects a current of the phototransistor using the approximated relationship so as to obtain a corrected detection current having a linear relationship with respect to lens positions, and detects the position of the lens using the obtained corrected detection current.

10. The lens position detecting circuit of claim 7, wherein the first amplifier is in a negative feedback configuration.

11. The lens position detecting circuit of claim 10, wherein the first amplifier configured in the negative feedback configuration includes:

a first resistor having a first terminal coupled to the output of the first amplifier and a second terminal coupled to the inverting input of the first amplifier; and a second resistor having first and second terminals, the first terminal coupled to the inverting input of the first amplifier and to the second terminal of the first resistor and the second terminal of the second resistor coupled to the second circuit terminal.

12. The lens position detecting circuit of claim 11, wherein the first amplifier configured in the negative feedback configuration includes:

a third resistor having first and second terminals, the first terminal of the third resistor coupled to the second output of the digital to analog converter and the second terminal of the third resistor coupled to the noninverting input of the first amplifier; and a fourth resistor having first and second terminals, the first terminal coupled to the noninverting input of the first amplifier and the second terminal of the fourth resistor coupled to a fourth circuit terminal.

13. The lens position detecting circuit of claim 12, further including a first photodetector having a first terminal, a second terminal, a third terminal, and a fourth terminal, the first terminal coupled to the first circuit terminal, the second terminal coupled for receiving a second source of operating potential, a node coupled to the second circuit terminal, the third terminal coupled for receiving the first source of operating potential and the fourth terminal coupled for receiving the second source of operating potential.

14. The lens position detecting circuit of claim 13, further including a second photodetector coupled to the correcting circuit.

15. The lens position detecting circuit of claim 13, wherein the first photodetector comprises:

a first photodiode having first and second terminals, the first terminal of the first photodiode serving as the first terminal of the first photodetector and the second terminal of the photodiode serving as the second terminal of the first photodetector; and a first phototransistor having first and second terminals the first terminal of the first phototransistor serving as the third terminal of the first photodetector.

16. The lens position detecting circuit of claim 15, further including a fifth resistor having first and second terminals, the first terminal of the fifth resistor coupled to the second terminal of the first phototransistor and the second terminal of the fifth resistor serving as the fourth terminal of the first photodetector.

17. A lens position detecting circuit, comprising:

a digital to analog converter having an input and a plurality of outputs;

a first amplifier having an input and an output, the input of the first amplifier coupled to a first output of the digital to analog converter;

a transistor having a control terminal and first and second current carrying terminals, the control terminal coupled to the first output of the digital to analog converter; the first current carrying terminal coupled for receiving a first source of operating potential, and the second current carrying terminal coupled to a first circuit terminal;

a second amplifier having an inverting input, a noninverting input, and an output, the noninverting input coupled to a second output of the digital to analog converter, the inverting input coupled to a second circuit terminal, and the output coupled to a third circuit terminal;

an analog to digital converter having an input and an output, the input coupled to the third circuit terminal; and a control unit having an input and first and second outputs, the input of the control unit coupled to the output of the analog to digital converter and the first output of the control unit coupled to the input of the digital to analog converter, wherein the control unit is configured to divide a moving range of a lens into a plurality of areas, approximates a relationship between lens positions and current of a phototransistor for each of the areas, corrects a current of the phototransistor using the approximated relationship so as to obtain a corrected detection current having a linear relationship with respect to lens positions, and detects a position of the lens using the obtained corrected detection current.

18. The lens position detecting circuit of claim 17, further including:

a photodiode having a first terminal coupled to the first circuit terminal and a second terminal coupled for receiving the second source of operating potential;

a phototransistor having first and second terminals, the first terminal coupled for receiving the first source of operating potential; and a first resistor having a first terminal coupled to the second terminal of the phototransistor and a second terminal coupled for receiving the second source of operating potential.

19. The lens position detecting circuit of claim 18, further including:

a capacitor coupled to the third circuit terminal; and a second resistor coupled to the fourth circuit terminal.

20. The lens position detecting circuit of claim 19, further including an actuator coupled to the output of the digital to analog converter.

* * * * *